United States Patent [19]

Nakazawa

[11] Patent Number: 4,844,150
[45] Date of Patent: Jul. 4, 1989

[54] AIR DISTRIBUTING MECHANISM FOR AN AUTOMOTIVE AIR CONDITIONING SYSTEM

[75] Inventor: Takeharu Nakazawa, Tamamura, Japan

[73] Assignee: Sanden Corporation, Gunma, Japan

[21] Appl. No.: 148,150

[22] Filed: Jan. 27, 1988

Related U.S. Application Data

[63] Continuation of Ser. No. 917,532, Oct. 10, 1986, abandoned.

[30] Foreign Application Priority Data

Oct. 11, 1985 [JP] Japan .............................. 60-155292[U]

[51] Int. Cl.⁴ .......................... B60H 3/00; B61D 27/00
[52] U.S. Cl. ........................................ 165/42; 165/43; 237/12.3 A; 237/12.3 B; 98/2.05; 98/2.08; 98/2.11
[58] Field of Search ...................... 165/22, 41, 42, 43, 165/17; 98/2.01, 2.08, 2.09, 2.11, 2.05; 62/239, 243, 244; 237/12.3 A, 12.3 B

[56] References Cited

U.S. PATENT DOCUMENTS

| | | | |
|---|---|---|---|
| 3,934,642 | 1/1976 | Coulson et al. | 165/42 |
| 4,223,720 | 9/1980 | d'Orsay et al. | 165/43 |
| 4,289,195 | 9/1981 | Bellot et al. | 165/42 |
| 4,356,965 | 11/1982 | Matsushima et al. | 165/43 X |
| 4,513,808 | 4/1985 | Ito et al. | 165/43 |
| 4,537,245 | 8/1985 | Nishimura et al. | 165/22 |
| 4,549,692 | 10/1985 | Busch et al. | 237/12.3 A |
| 4,562,954 | 1/1986 | Kajita | 165/42 |
| 4,572,430 | 2/1986 | Takagi et al. | 165/42 X |
| 4,593,852 | 6/1986 | Tajima et al. | 98/2.08 |
| 4,681,153 | 7/1987 | Uchida | 165/43 |

FOREIGN PATENT DOCUMENTS

| | | | |
|---|---|---|---|
| 2655554 | 6/1978 | Fed. Rep. of Germany | 98/2.08 |
| 2815012 | 10/1978 | Fed. Rep. of Germany | 165/42 |
| 0026010 | 2/1982 | Japan | 62/239 |
| 0182514 | 11/1982 | Japan | 165/42 |
| 0182515 | 11/1982 | Japan | 165/43 |
| 0085711 | 5/1983 | Japan | 62/243 |
| 0218417 | 12/1983 | Japan | 62/243 |
| 0218420 | 12/1983 | Japan | 62/243 |

Primary Examiner—Albert W. Davis, Jr.
Assistant Examiner—John K. Ford
Attorney, Agent, or Firm—Banner, Birch, McKie & Beckett

[57] ABSTRACT

An air distributing mechanism for an automotive air conditioning system comprises an air duct which includes inlet openings and a plurality of outlets, such as an upper outlet, a defroster outlet and lower outlet. An evaporator and heater core are disposed within the air duct for cooling and heating the air, respectively. The heater core is disposed within the duct to partly cover the duct passageway and form a by-pass way. A first damper, a second damper and damper means are disposed at predetermined positions so as to control the direction of air flow in the air flow duct. A bi-level damper is also disposed at a position to face toward the second damper so as to define a cooled air passageway to communicate between the by-pass way and upper outlet. Also, the cooled air and warm air are mixed with one another by change of the angle of the bi-level damper. According to the above-mentioned construction, cooling air and warm air are not only definitely separated during the bi-level mode, but also can be mixed at some constant volume, respectively. Thus the temperature of air flowing into each of the outlets is controlled as desired without using any other temperature controlling devices.

1 Claim, 3 Drawing Sheets

AIR DISTRIBUTING MECHANISM FOR AN AUTOMOTIVE AIR CONDITIONING SYSTEM

This application is a continuation of application Ser. No. 917,532, filed 10-10-86, now abandoned.

TECHNICAL FIELD

The present invention relates to an automotive air conditioning system, and more particularly, to an air distributing mechanism for the automotive air conditioning system.

BACKGROUND OF THE INVENTION

Generally, an automotive air conditioner is provided with an air duct which has air inlet openings and air outlet openings, and includes heat exchangers with a plurality of damper elements to control the temperature and passageway of the air.

With reference to FIG. 1, a conventional structure of an automotive air conditioner is shown.

Air duct 1 has air inlet opening 2 which communicates with an external space and compartment of the automobile through a recirculated air inlet (not shown). Air duct 1 also has a plurality of outlets, such as upper outlet 3, lower outlet 4 and defroster outlet 5 each of which opens into the compartment. The air is drawn through the air duct 1 from air inlet 2, and flows out into the automobile compartment from upper outlet 3, lower outlet 4 and defroster outlet 5. Normally, is air circulation is forced by blower device 6 disposed in the air inlet side of duct 1.

Evaporator 7 which is a part of a refrigerant circuit is disposed in air duct 1 for cooling air passing therethrough. Heater core 8 is also disposed in air duct 1, down stream from evaporator 7, to divide the passageway of duct 1 into two ways. That is heater core 8 is placed so as to partly cover the passageway of duct 1 so as to form a bypass way 10 in the duct. Thus, a passage to pass through cooled air is provided. The rear side space of heater core 8 functions as an air mixture chamber 14, because, in the mixture chamber 14, the air passed through heater core 8 and air passed through bypass way 10 are mixed with one another to control the temperature of air flow out into the automobile compartment through one of the outlets. Air inflow volume through heater core 8 and bypass passage 10 should be controlled by a first damper 9 disposed on the front side of heater core 8. The opening and closing of upper outlet 3 is controlled by a second damper 11. The opening and closing of lower outlet 4 is controlled by a third damper 12. Also, the opening and closing of defroster outlet 5 is controlled by a fourth damper 13.

In the above-mentioned automotive air conditioning system, during the bi-level mode, i.e., when cool air is flowing out from upper outlet 3 and warm air is flowing out from lower outlet 4, the out flow of air from upper and lower outlets 3 and 4 is normally a mixture of both cooled and warm air. This is because, second damper 11 is not disposed in duct 1 to divide the mixture within chamber 14 into two chambers when second damper 11 is positioned to open the upper outlet 3. Therefore, in the bi-level mode, the flow ways of cooled air and warm air are not clearly divided from one another. As a result of this structure, the temperature differential between cool air flowing into upper outlet 3 and warm air flowing into lower outlet 4 becomes small.

One solution to resolve the above-mentioned disadvantage is to clearly divide the mixture chamber into two chambers when the air conditioner is operated at the bi-level mode. As shown in FIG. 2, partition wall 31 of upper outlet 3 could be extended into mixture chamber 14 to divide chamber 14 into two chambers due to operation of second damper 11. In this structure of the air conditioner, if the air conditioner is operated in the bi-level mode, cooled air passes through by-pass passage 10 and warm air passes through heater core 8, flowing in separate ways, and not mixed with one another. Therefore, the temperature differential between cool air passing through upper outlet 3 and warm air passing through lower outlet 4 is too large. However, if the air conditioner is operated in the cooling mode, second damper 11 opens upper outlet 3 and divides the mixture in chamber 14 into two chambers. That is, cooled air passes through by-pass passage 10 to directly flow out of the compartment through upper outlet 3 and is not mixed with warm air passed through heater core 8. Therefore, the temperature of the air flowing into the automobile compartment can not be controlled by mixture of cooled and warm air. The temperature of the air needs to be controlled by a thermostat.

SUMMARY OF THE INVENTION

It is a primary object of this invention to provide an air distributing mechanism for an automotive air conditioning system in which the temperature control can be easily operated by an air mixture operation, even though the passageways for the cooled air and warm air are totally separated at the time of bi-level mode operation.

The air distributing mechanism for an automotive air conditioning system according to the present invention comprises an air duct which is provided with at least one air inlet and a plurality of air outlets at one end portion thereof. The air outlets at least consist of an upper outlet, a defroster outlet and a lower outlet. Blower means is disposed in the duct to force air circulation. An evaporator and heater core are serially disposed in the air duct and the heater core is disposed in the duct to partly cover the overall passageway of the duct and form an air bypass way.

A first damper is disposed on the front side of the evaporator to control the amount of air flow into the evaporator and the amount flowing into the bypass way. A second damper is disposed in the duct to control the opening and closing of the upper outlet. Third and fourth dampers are disposed in the duct to control the opening and closing of the defroster and lower outlets. A bi-level damper is disposed on the rear side of the heater core to define the way of air flow cooperating with the second damper and thereby defining the air flow opening for communicating between the air mixture chamber and the upper outlet way.

Further objects, features and aspects of this invention will be understood from the following detailed description of preferred embodiments of this invention, referring to the annexed drawings.

DETAILED DESCRIPTION OF THE PREFERRED EMBODIMENTS

Figure 1:
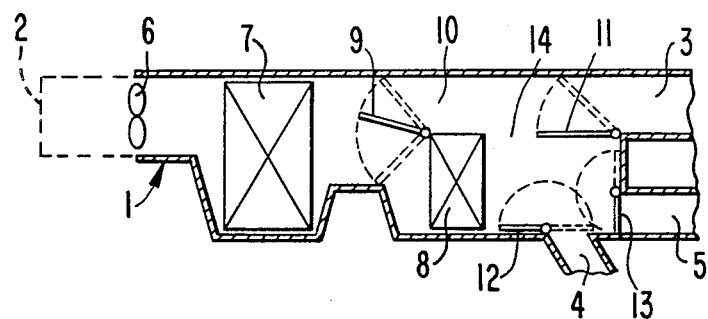
FIG. 1 is a schematic view of a conventional air distributing mechanism for an automotive air conditioning system.
Figure 2:
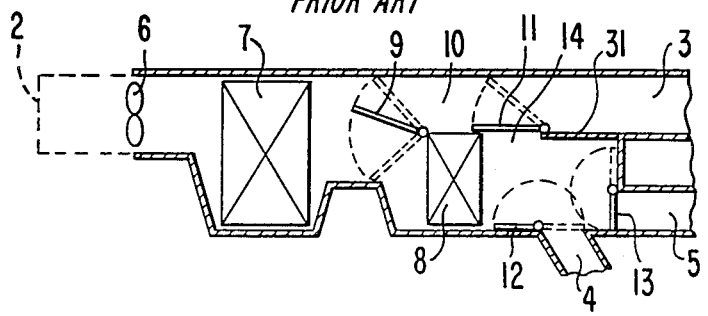
FIG. 2 is a schematic view of another conventional air distributing mechanism for an automotive air conditioning system.
Figure 3A:
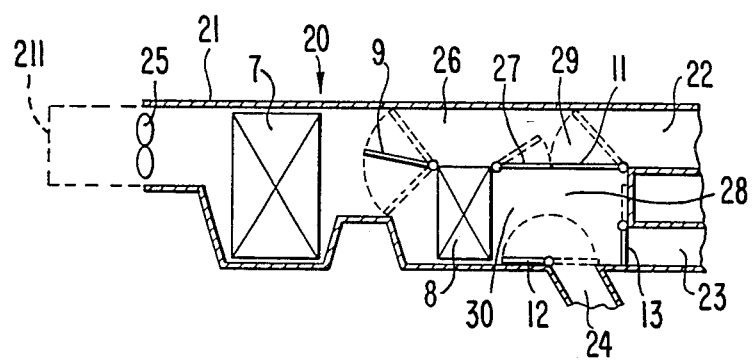
FIGS. 3A to 3E are schematic views of an automotive air conditioning system in accordance with one embodiment of the present invention illustrating the position of the dampers in each mode of air conditioner operation.

With reference to FIG. 3A, an air distributing mechanism for an automotive air conditioning system in accordance with one embodiment of this invention is shown.

The air conditioner 20 of the automobile air conditioning system includes an air duct 21 which is provided with air inlet openings 211 and air outlet openings, such as upper outlet 22, defroster outlet 23 and lower outlet 24 to form the air circulating passageway. Air inlet openings 211 face toward the compartment space of the automobile and also face toward an external space to withdraw circulated air from within the compartment or fresh air. The air circulation of the air conditioner may be forced by a blower device 25.

Evaporator 7 which consists of a part of a refrigerating circuit for cooling the air disposed in duct 21 to generally fully fill the passageway of duct 21. Therefore, essentially all of the inlet air will be passed through evaporator 7. Heater core 8 is also disposed in duct 21, placed downstream from evaporator 7 and only partly filling the passageway of duct 21. Thus, an air bypass way 26 is formed in the duct 21 so that cooled air can be passed downstream of the heater core 8 without passing therethrough. The space at the rear side of heater core 8 functions as an air mixture chamber 28, i.e., the warm air passed through heater core 8 and cooled air passed through bypass way 26 are mixed in mixture chamber 28.

The opening and closing operation of each of the outlets 22, 23 and 24 is controlled by dampers 11, 13 and 12, respectively. Upper outlet damper 11 is extended within air mixture chamber 28 to partly divide chamber 28. Also, the air flow amount flowing into the heater core 8 and bypass way 26 is controlled by first damper 9 which is disposed on the front side of heater core 8. Bi-level damper 27 is disposed on the rear side of heater core 8 to face the upper outlet damper 11. Therefore, bi-level damper 27 is able to divide air mixture chamber 28 into two chambers due to its cooperating with the upper outlet damper 11.

Figure 3B:
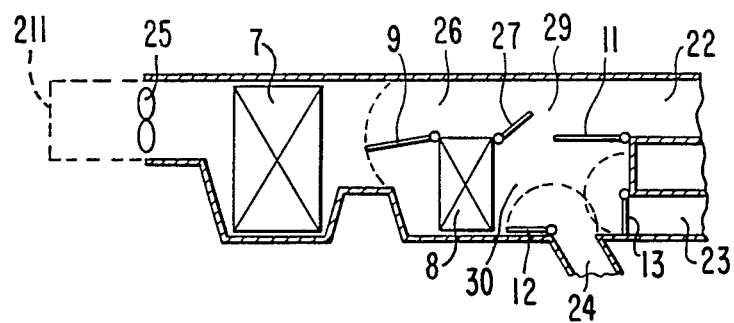
Figure 3C:
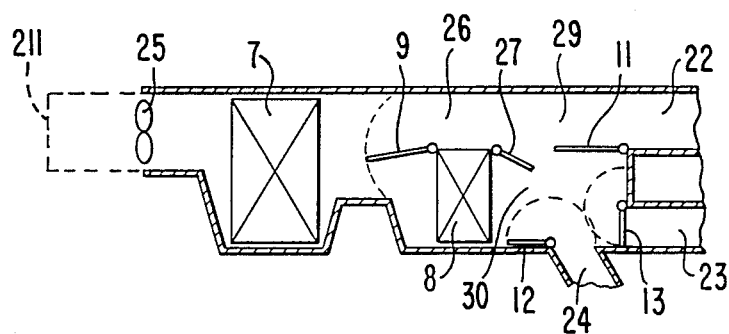
Figure 3D:
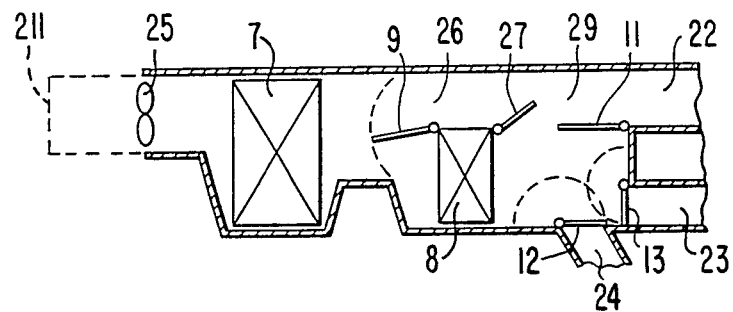
Figure 3E:
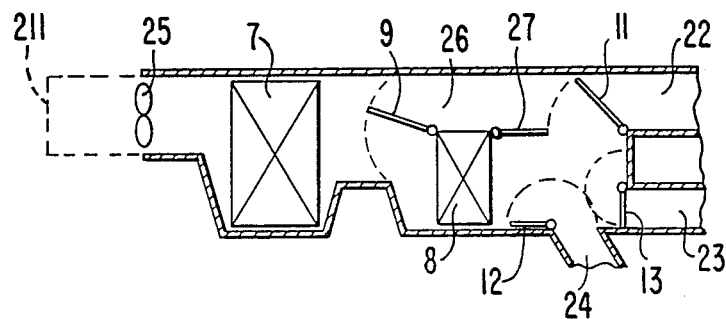

Referring to FIGS. 3A and 3E the operation of the air conditioner will be explained.

As shown in FIG. 3A, if bi-level damper 27 and upper outlet damper 11 are placed in a horizontal position to divide the air mixture chamber 28 into two passageways, defroster outlet 23 is closed by damper 13 and lower outlet 24 is open by reason of the position of damper 12. This mode is a bi-level mode. In this mode, cooled air passed through evaporator 7 and bypass passage 26 and warm air passed through heater core 8 are not mixed with one another. Cooling air is flowing into upper outlet 22 through upper passage 29, which is disposed in the upper portion of mixture chamber 28 by bi-level damper 27 and upper outlet damper 11. Also, warm air is flowing into lower outlet 24 through lower passage 30, which is disposed on the lower portion of mixture chamber 28 by reason of the positions of bi-level damper 27 and upper outlet damper 11, respectively.

In the bi-level mode, if bi-level damper 27 is rotated upwardly to form an open space, as shown in FIG. 3B, warm air passed through heater core 8 flows into upper passage 29 through the opening, then warm air and cool air are mixed. Therefore, the temperature of cooling air flowing out from upper outlet 22 is controlled by mixture of cooled air and warm air. Since, the volume of warm air flowing into upper passage 29 is controlled by the inclined angle of bi-level damper 27, the temperature control of the air would be controlled by the inclined angle of bi-level damper 27.

Conversely, if bi-level damper 27 is rotated downward to form the opening, as shown in FIG. 3C, cooling air passed through upper passageway 29 flows into lower passage 30, such that cooling air and warm air are thus mixed. Therefore, the temperature of warm air flowing out from lower outlet 24 is controlled by the change of the inclined angle of bi-level damper 27 because the volume of cooled air flowing into lower passage 30 is changed by the inclined angle of bi-level damper 27.

As shown in FIG. 3D, if defroster outlet 23 and lower outlet 24 are closed by dampers 13 and 12, respectively, and upper outlet 22 is still open, this mode is a vent mode. In this mode, the air is only flowing out from upper outlet 22. The control of temperature of outflowing air will be changed due to mixture of cooled air and warm air.

Furthermore, if upper outlet 22 and defroster outlet 23 are closed, and only lower outlet 24 is open, this mode is "foot" mode. In this mode, the air is only supplied into the automobile compartment from lower outlet 24. The temperature of outflowing air is controlled by change of position of first damper 9. Because first damper 9 is changed, the amount of air flow passed through heater core 8 and bypass way 26 changes and cooled air and warm air are mixed with one another in lower passage 30.

Figure 4:
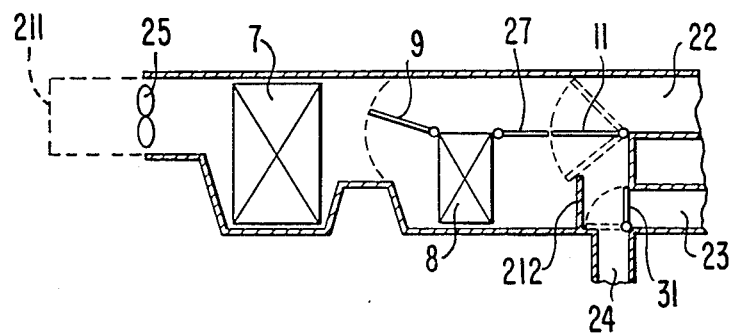
FIG. 4 is a schematic view of a distributing system in accordance with another embodiment of the present invention.

Referring to FIG. 4, an air distributing mechanism for air flow of an automotive air conditioning system in accordance with another embodiment of this invention is shown. In this embodiment, the opening and closing of defroster outlet 23 and lower outlet 24 controlled by reversing one damper 31. Also, the communication between mixture chamber 28 and defroster and lower outlets 23 and 24 is controlled by upper outlet damper 11 and partition wall 212 extended into mixture chamber 28 from the inner surface of duct 21. Therefore, the control of damper elements will be easily operated.

Although the invention has been described in detail in connection with a preferred embodiment, it will be understood by those skilled in the art that this embodiment is only for illustration. Various modifications may be made therein by one skilled in the art without departing from the scope or spirit of this invention, which is only limited by the appended claim.

What is claimed is:

1. An air distributing mechanism for an automotive air conditioning system comprising:
   an air duct including at least one air inlet opening and a plurality of outlets comprising an upper outlet, a defroster outlet, and a lower outlet;
   blower means for forcing air circulation toward said outlets;
   an evaporator forming a part of an air conditioner circuit disposed in said air duct;

a heater core disposed in said air duct rearwardly of said evaporator partially across said air duct;

a bypass way formed in said duct located above and bypassing said heater core;

a first damper disposed rearwardly of said evaporator and forwardly of said heater core positioned to control the amount of air flowing into said heater core and said bypass way;

a second damper disposed forward of said upper outlet to control the opening and closing of said upper outlet;

damper means for controlling the opening and closing of said defroster outlet and said lower outlet;

a mixing chamber including a lower passage rearward of said heater core and an upper passage rearward of said bypass way, said lower passage adjacent said defroster outlet and said lower outlet, and said upper passage adjacent said upper outlet; and a bi-level damper pivotably disposed between said upper and lower passages;

said first damper, said second damper, said damper means, and said bi-level damper positionable in at least a vent mode in which said second damper is positioned to open said upper outlet and said damper means is positioned to close said defroster outlet and said lower outlet, a foot mode in which said second damper is positioned to close said upper outlet and said damper means is positioned to close said defroster outlet and open said lower outlet, a defrost mode in which said second damper is positioned to close said upper outlet and said damper means is positioned to close said lower outlet and open said defroster outlet, and a bi-level mode in which said second damper is positioned to open said upper outlet and said damper means is positioned to open said lower outlet, and in said bi-level mode said bi-level damper is movable between at least two mixing positions and an isolating position, in one of said mixing positions said bi-level damper positioned in said lower passage of said mixing chamber to allow air flow into said lower passage from said bypass way and in the other of said mixing positions said bi-level damper positioned in said upper passage of said mixing chamber to allow air flow from said lower passage into said upper passage to mix the air flowing through said heater core and the air flowing through said bypass way to thereby control the temperature of the air flowing through said upper outlet and said lower outlet, and in said isolating position said bi-level damper and said second damper are adjacent to one another and cooperate to isolate air flowing through said upper outlet via said bypass way from air flowing through said lower outlet via said heater core.

* * * * *